July 28, 1953  J. FAVRE  2,646,718
MOTION PICTURE CAMERA
Filed May 15, 1951  3 Sheets-Sheet 1

INVENTOR
Jules Favre.
BY
ATTORNEY

July 28, 1953  J. FAVRE  2,646,718
MOTION PICTURE CAMERA
Filed May 15, 1951  3 Sheets-Sheet 2
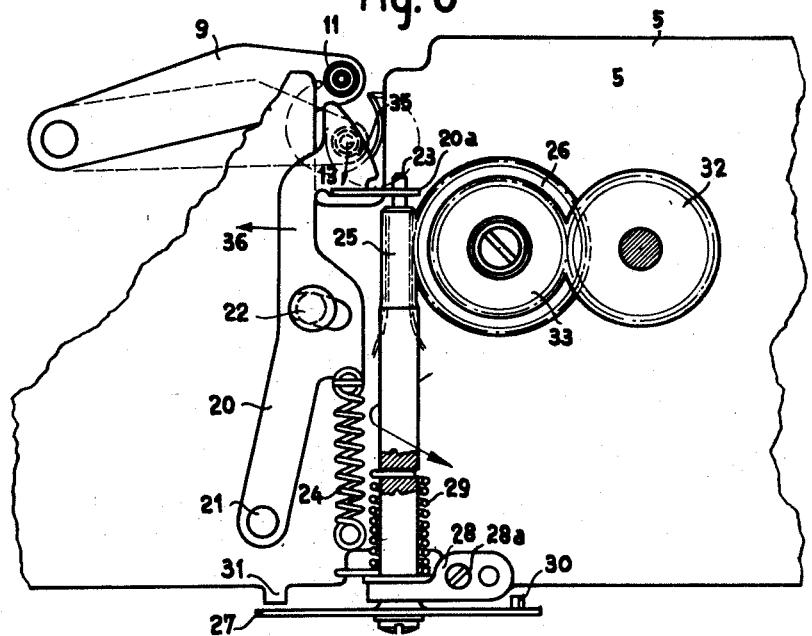
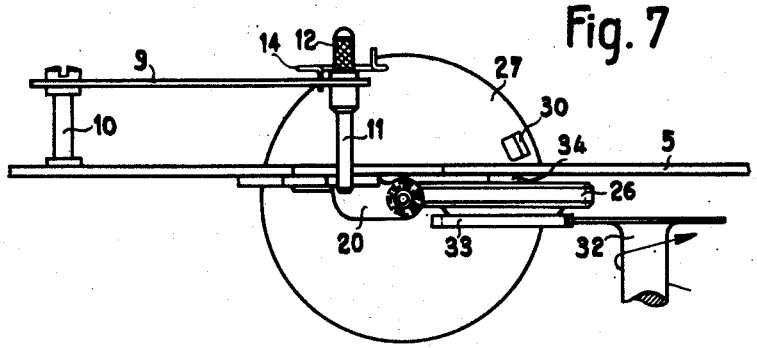
INVENTOR
Jules Favre.
BY
ATTORNEY July 28, 1953  J. FAVRE  2,646,718
MOTION PICTURE CAMERA Filed May 15, 1951  3 Sheets-Sheet 3

INVENTOR
Jules Favre.

BY

ATTORNEY

Patented July 28, 1953

2,646,718

UNITED STATES PATENT OFFICE 2,646,718

MOTION PICTURE CAMERA

Jules Favre, Neuchatel, Switzerland, assignor to Paillard S. A., Sainte-Croix, Switzerland, a company of Switzerland Application May 15, 1951, Serial No. 226,414
In Switzerland June 26, 1950

6 Claims. (Cl. 88—18.4)

This invention relates to a motion-picture camera of the type including a gate for guiding the film, a pressure plate for holding the film in the gate, a claw for driving the film, and a meter for measuring the length of film used. In such an apparatus, four operations are required for introducing the film, namely: (1) opening the cover; (2) withdrawal of the claw; (3) opening the pressure plate; and (4) setting the meter to zero.

With existing apparatus, these four operations are performed in various ways. In certain apparatus each operation must be performed individually; in others, two operations are performed together. For instance, the opening of the pressure plate and the withdrawal of the claw are effected in one and the same operation, whereas the setting of the meter to zero is independent, or else the setting of the meter is effected together with the opening of the pressure plate, whereas the withdrawal of the claw is independent. In still other apparatus, all of the aforementioned operations are combined with the opening of the cover.

Assuming that the setting of the meter to zero and the withdrawal of the claw take place jointly with the opening of the cover, there remains but one operation to be performed to load the film, that is, the opening or release of the pressure plate.

This solution presents certain disadvantages because it is impossible to feed film while the cover is held open, inasmuch as the claw does not engage the perforations. Moreover, the fact that the meter is set at zero when the cover is opened may result in an erroneous estimate of the length of film remaining to be used, since it may happen that the apparatus has to be opened for the purpose of checking its operation, for example.

The motion-picture camera of the present invention is characterized by the fact that it comprises an arrangement permitting the release of the pressure plate, the wtihdrawal of the claw, and the setting at zero of the meter in a single operation, independent of the opening of the cover of the apparatus.

The accompanying drawing shows, by way of example, one form of apparatus constructed according to the invention:

Figures 6 and 7 are respectively a bottom plan view and a side view of the mechanism for driving the meter.

Similar reference characters designate corresponding parts throughout the several figures of the drawings.

Figure 1:
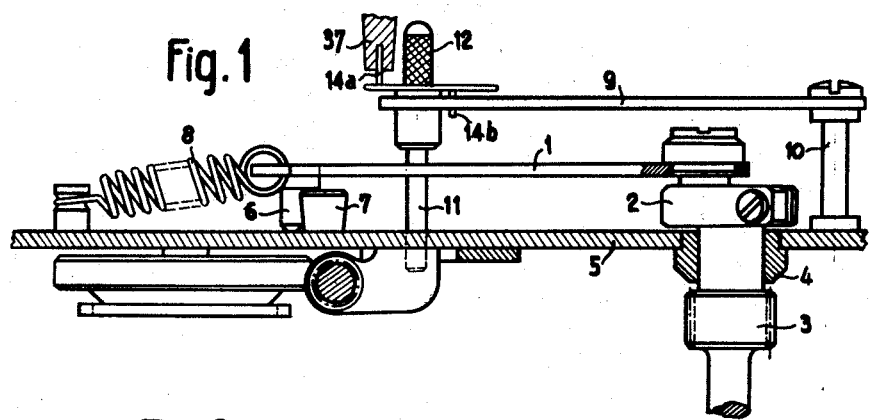
Figure 1 shows a partial section showing the driving mechanism for the claw and the meter.

In the apparatus shown in the drawings, one end of claw 1 is pivotally mounted on an eccentric 2 rigidly secured to shaft 3 rotating in bearing 4 riveted onto a base 5. In the operative position, the other end of claw 1, under the influence of a tension spring 8 and through the intermediary of a projection 6, bears upon a stud 7 rigidly secured to base 5. When the apparatus is not in use, the film feeding claw occupies the position shown in Figures 1 and 2.

A control lever 9, one end of which is pivotally mounted on a support 10 rigidly secured to base 5, is provided at its other end with a pin 11 passing through an opening in base 5 and having an operating knob 12. When the apparatus is in operation, control lever 9, under the action of an arcuate spring 14, occupies a position in which pin 11 does not touch claw 1. Between its two ends, lever 9, moreover, has a crown or boss 18 intended to come into contact with pressure plate 15 (see Figures 2 and 3) under the action of spring 14. In the operative position, plate 15 holds the film in the gate 16. At 17 this plate is pivotally mounted on a flange integral with gate 16. A leaf spring 19, fastened to gate 16 bears against plate 15 on the other side of its pivoting point 17 and tends to rock the plate away from the film gate.

Figure 3:
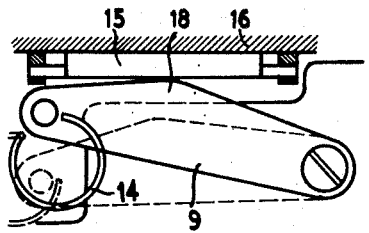
Figure 3 is a plan view of the mechanism controlling the opening of the pressure plate.
Figures 4, 5:
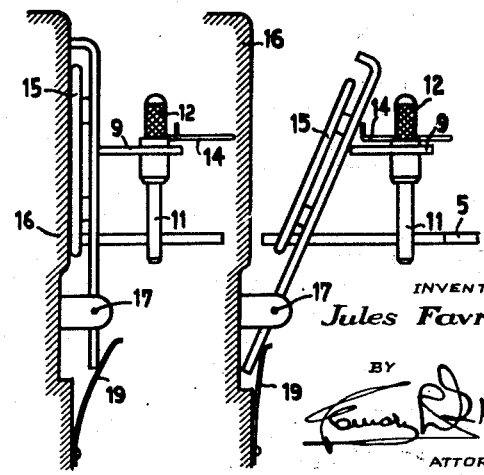
Figures 4 and 5 are detail diagrammatic views, Figure 4 showing the pressure plate closed, whereas in Figure 5 it is open.
Figure 8:
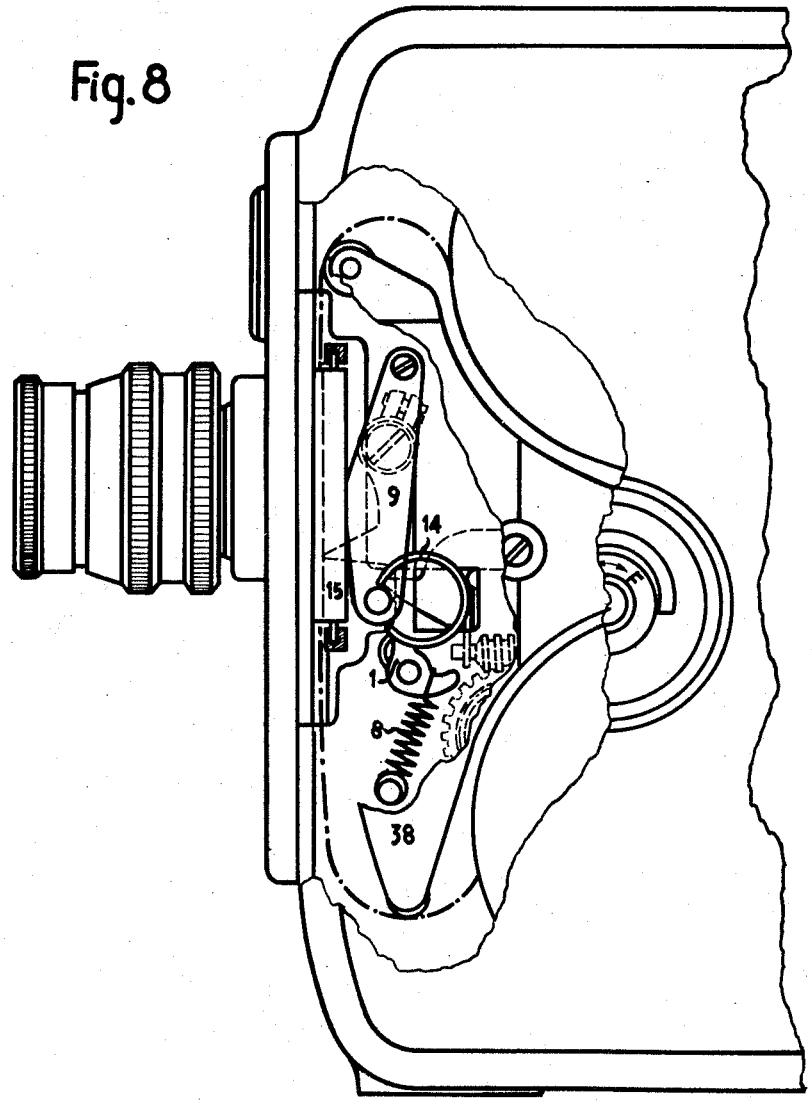
Figure 8 is a plan view of the picture taking apparatus with one side wall partially broken away to illustrate the location of parts of the invention relative to the camera body and lens.

The extremity 14ᵃ of the spring 14 can pivot in a groove provided for in a boss 37 of a guard wall element 38 (see broken away portion in Figure 8). The other extremity 14ᵇ of spring 14 is capable of turning in an opening 39 located in lever 9. Hence, spring 14 allows lever 9 to be kept in its two extreme positions, that is to say, in one instance the position shown in Figures 2, 3, 4 and 8 in which it keeps the plate 15 closed, and in the other instance in the position shown in dotted lines in Figures 2 and 3 and in solid lines in Figure 5, in which position it permits plate 15 to open.

The arrangement for setting the meter to zero is mounted under the base 5 (see Figures 6 and 7). A clutch lever 20, pivoted at 21 and retained and guided against the base by a rivet 22, has an offset angularly disposed journal portion 20ᵃ which supports the end of a shaft 23 carrying a pinion 25. A tension spring 24 produces a torque on lever 20 about pivot 21 and causes pinion 25 to engage a worm 26. Shaft 23 carries at its other end a disc 27 provided with graduations or scale of the meter. This shaft 23 rotates in a bearing 28 pivoted to frame part 5 at 28ᵃ and a torque is imparted to it by a torsion spring 29. Disc 27 has a tongue 30 intended to come to rest against a projection 31 of plate 5 when the entire film has been used up. The meter is controlled by a toothed wheel 32 and through the intermediary of a second toothed wheel 33 rigidly connected to the worm 26 pivotally mounted on a pin 34 riveted to base 5.

Lever 20 is positioned in such a way that, in the operative position, its rounded nose 35 does not touch pin 11 of lever 9. Before the apparatus is loaded, torsion spring 29 is set, and inasmuch as worm 26 and pinion 25 are in mutual engagement, spring 29 cannot set disc 27 back to zero.

The operation of the mechanism herein described is as follows:

When a new film is to be loaded in the apparatus, after the latter has been opened, control lever 9 is manually displaced in the direction of arrow 13 (Figures 2 and 6) by means of knob 12. Pin 11 bears then against claw 1 and causes the latter's withdrawal from abutment rivet 7. Claw 1 pivots on eccentric 2 and sets or energizes spring 8. Simultaneously with the displacement of lever 9, pressure plate 15 is released for opening and pivots at 17 under the action of spring 19. The pressure plate then assumes the full open position indicated in Figure 5.

In the course of the same movement of lever 9, pin 11 enters into contact with the rounded nose 35, then slides on it with the result that lever 20 is caused to rotate about pivot 21 in the direction of arrow 36 (Figure 6). In its movement, lever 20 carries pinion 25 out of mesh with worm 26 and permits motor driven shaft 23 to turn under influence of spring 29 to set disc 27 back to zero. This position is reached the moment tongue 30 abuts against projection 31.

The lever 9 is kept in loading position by spring 14.

From the preceding description it is clear that, after the cover has been opened, only one operation is necessary for withdrawing the claw, opening the pressure plate, and setting the meter to zero.

Figure 2:
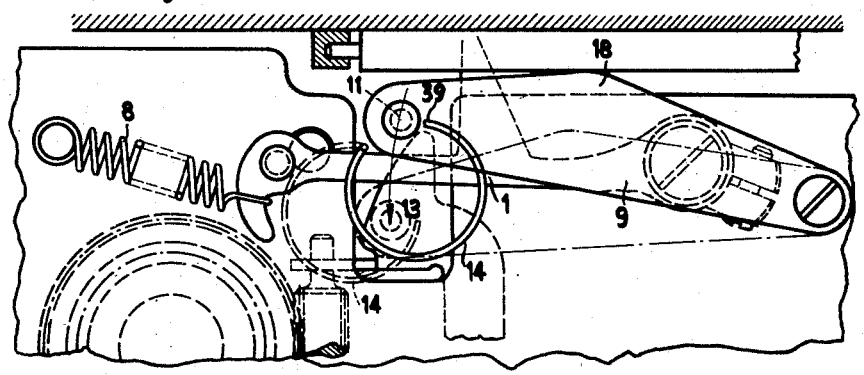
Figure 2 is a plan view of it.

Once the film has been introduced in the apparatus, lever 9 is brought back to its initial position, as shown in Figure 2. To prevent the cover of the apparatus from closing while lever 9 is in the open position, a baffle of known construction may also be provided. It would be sufficient, for instance, to provide on the cover a boss coming for abutting against operating knob 12 whenever the cover is to be closed while lever 9 is in the loading position. Instead of providing a baffle to prevent the closing of the cover, one could also make provision for any well known mechanism for automatically bringing lever 9 back to its initial position by closing the cover. For instance, an inclined plane integral with the cover would act on control knob 12.

With an apparatus of the type herein described, it is possible to control the passage of the film in the camera while the cover is open. This apparatus, moreover, makes it possible to take certain trick pictures necessitating the opening of the cover without disturbing the meter.

I claim:

1. In a motion picture camera including frame parts, a meter for measuring the length of film used, a film gate, a film pressure plate pivotally supported adjacent the said gate, a spring for tensioning the gate, a control lever pivoted to a frame part and having a portion engageable with the plate for normally maintaining it closed relative to the gate, an annular spring having one end anchored in the lever and the other end anchored in a frame part for tensioning the lever, an operator's knob on the lever, a pin on the lever extending oppositely to the said knob, an eccentrically mounted claw arm spring tensioned at its claw end and held against an abutment on a frame part when the camera is normally ready for use, said pin disposed in a position to engage the claw arm but normally free thereof when the lever carrying the pin maintains the plate closed; and means for setting the said meter to zero, said means comprising a spring urged clutch lever pivoted for limited movement on a frame part in a plane at right angles to said pin and having a nose to be engaged by said pin, an offset journal position on the control lever, a driven shaft having one end mounted in the said offset journal portion and provided at its other end with a scale disc, a pivoted bearing for the end of the shaft near the scale disc meter gearing, a worm on the shaft for normally engaging the meter gearing, said control lever when manually moved by said knob causing the same to move away from the plate and also causing the pin to release the claw arm and move the clutch lever to withdraw said worm out of mesh with the meter gearing.

2. A motion-picture camera, comprising, a frame, a film gate for guiding the film, a pressure plate for maintaining the film in the gate and spring biased away from the gate, a claw for moving the film, an actuating shaft for the claw, a meter for measuring the length of film used, means for resetting the meter to zero, a manually operated spring biased lever pivotally mounted at one end on a part of the frame adjacent the shaft, a medial portion of said lever normally spring urged in contact with the pressure plate to maintain the film in the film gate, and a lateral pin rigidly secured to the free end of said lever, the medial portion of said pin engageable with the claw and the end portion of said pin engageable with said means for setting the meter to zero, whereby a single operation of the said lever permits spring opening of the pressure plate, the disengagement of the claw from the film and the setting of the meter to zero.

3. A motion-picture camera, comprising, a frame, a film gate for guiding the film, a pressure plate for maintaining the film in the film gate, a spring for urging the plate outwardly from the gate, a claw for moving the film, an actuating shaft for the claw, a meter for measuring the length of film used, a control member for resetting the meter to zero, and a manually operated lever pivotally mounted at one end on a fixed part of the frame, a spring urging the said lever against the outwardly spring biased pressure plate, the medial portion of the said lever being normally in spring urged contact with the pressure plate, and a lateral pin rigidly secured to the free end of said lever, a medial part of the said pin engageable with the claw and the end portion of said pin cooperating with said control member for setting the meter to zero.

4. A motion-pitcure camera, comprising, a frame, a base having an opening, a meter, mechanism for driving the meter for measuring the length of film used on one side of the base, resetting control means for said mechanism, a claw on the other side of the base for moving the film, an eccentric for effecting reciprocating movement of the claw to move the film, a film gate for guiding the film, a pressure plate for maintaining the film in the gate, means for rocking the said plate away from the gate, and a manually controlled lever pivotally mounted at one end on said frame, a spring tending to maintain the said lever in opposite positions, said lever having a medial portion in permanent slidable contact with the pressure plate, a lateral pin rigidly secured to the free end of said lever passing through said opening in the base, the medial portion of the said pin engageable with the claw and the end portion of said pin engageable with said resetting control means for setting the meter to zero, opening the pressure plate, withdrawing the claw.

5. A motion-picture camera, comprising, a base having an opening, a meter for measuring the length of film used supported on one side of the base, a control member for setting the meter to zero, driving mechanism for said meter, a claw for moving the film on the side of the base opposite the meter, an eccentric for said claw, a film gate for guiding the film, a pivotally mounted pressure plate for maintaining the film in the film gate and spring biased away from the gate, a manually controlled lever pivotally mounted on the said base, a spring tending to maintain the said lever in two extreme positions, said lever having a portion in continuous contact with the pressure plate, a pin secured at a right angle to said lever and passing through the said opening in the base, one part of the said pin cooperating with the claw and another part of said pin located near its end cooperating with said control member for setting the meter to zero; the opening of the pressure plate, the withdrawal of the claw and the setting to zero of the meter being brought about by a single operation of the said manually controlled lever, independently of the opening of the cover of the camera.

6. A motion-picture camera, comprising, in combination, a frame, a film gate for guiding the film, a pivotally supported pressure plate spring urged away from the gate and normally maintaining the film in the gate, a claw for moving the film, an actuating shaft for the claw, a meter for measuring the length of the film used, means for resetting the meter to zero, and a manually operated control lever pivoted at one end to the frame adjacent said shaft, means on the medial portion of said lever engaging and normally holding the pressure plate in closed position, a spring for biasing the control lever to normal position in which it holds said control lever against the pressure plate, a lateral pin at the free end of the lever, an operator's knob on the end of the lever having the pin, said control lever when manually moved through said knob from the normal position in which it is held by said spring releasing the pressure plate to move away from the film gate; and said pin on the lever engaging the claw to withdraw it from film feeding position and also actuating the means for setting the meter to zero.

JULES FAVRE.

No references cited.